United States Patent
Mun et al.

(10) Patent No.: US 10,300,900 B2
(45) Date of Patent: May 28, 2019

(54) PISTON FOR MASTER CYLINDER

(71) Applicant: erae AMS Co., Ltd., Daegu (KR)

(72) Inventors: Bu-Geun Mun, Daegu (KR); Jong-Dae Weon, Daegu (KR); Yu-Jong Seo, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 98 days.

(21) Appl. No.: 15/317,403

(22) PCT Filed: Jun. 9, 2015

(86) PCT No.: PCT/KR2015/005769
§ 371 (c)(1),
(2) Date: Dec. 8, 2016

(87) PCT Pub. No.: WO2015/190800
PCT Pub. Date: Dec. 17, 2015

(65) Prior Publication Data
US 2017/0106844 A1    Apr. 20, 2017

(30) Foreign Application Priority Data
Jun. 13, 2014    (KR) .................. 10-2014-0071819

(51) Int. Cl.
*B60T 11/236* (2006.01)
*B60T 11/16* (2006.01)
*B60T 11/20* (2006.01)
*F16J 15/16* (2006.01)
*B60T 11/228* (2006.01)

(52) U.S. Cl.
CPC ............ *B60T 11/236* (2013.01); *B60T 11/16* (2013.01); *B60T 11/20* (2013.01); *B60T 11/228* (2013.01); *F16J 15/16* (2013.01)

(58) Field of Classification Search
CPC ..... B60T 11/118; B60T 11/232; B60T 11/236
See application file for complete search history.

(56) References Cited

U.S. PATENT DOCUMENTS

| | | | |
|---|---|---|---|
| 5,172,626 A | 12/1992 | Hart | |
| 6,272,858 B1 * | 8/2001 | Takano | B60T 11/20 60/588 |
| 7,040,093 B2 | 5/2006 | Legret et al. | |
| 7,055,322 B2 | 6/2006 | Yasuda et al. | |

(Continued)

FOREIGN PATENT DOCUMENTS

| | | | |
|---|---|---|---|
| FR | 2989045 A1 * | 10/2013 | ............ B60T 11/20 |
| JP | 2005-112188 A | 4/2005 | |

(Continued)

*Primary Examiner* — Michael Leslie
*Assistant Examiner* — Matthew Wiblin
(74) *Attorney, Agent, or Firm* — Novick, Kim & Lee, PLLC; Jae Youn Kim

(57) ABSTRACT

A master cylinder includes: a cylinder housing; a piston which is movably disposed in the cylinder housing so as to form a pressure chamber and a hydraulic fluid supplying chamber; a sealing member which is interposed between the cylinder housing and the piston. The piston has a plurality of communication holes for connecting the pressure chamber and the hydraulic fluid supplying chamber, and the plurality of communication holes are formed on a slanted surface which is provided to an outer surface of the piston.

4 Claims, 6 Drawing Sheets

(56) References Cited

U.S. PATENT DOCUMENTS

| | | | | |
|---|---|---|---|---|
| 9,663,085 | B2* | 5/2017 | Tanabe | B60T 11/236 |
| 9,969,373 | B2* | 5/2018 | Konig | B60T 11/20 |
| 2005/0115237 | A1* | 6/2005 | Tsubouchi | B60T 11/22 |
| | | | | 60/562 |
| 2008/0022675 | A1* | 1/2008 | Drott | B60T 11/16 |
| | | | | 60/588 |

FOREIGN PATENT DOCUMENTS

| | | |
|---|---|---|
| JP | 2006-168430 A | 6/2006 |
| JP | 2009-56922 A | 3/2009 |
| JP | 2012-76550 A | 4/2012 |
| JP | 2014-100947 A | 6/2014 |
| KR | 10-0389951 B1 | 7/2003 |
| KR | 10-2009-0055624 A | 6/2009 |
| KR | 10-2012-0047464 A | 5/2012 |
| KR | 10-1207805 B1 | 12/2012 |

* cited by examiner

PISTON FOR MASTER CYLINDER

CROSS-REFERENCE TO RELATED APPLICATION

This application is a national-entry under 35 USC § 371 of PCT/KR2015/005769 filed on Jun. 9, 2015, and claims priority to Korean Patent Application No. 10-2014-0071819 filed in the Korean Intellectual Property Office on Jun. 13, 2014, the entire contents of which are incorporated herein by reference.

TECHNICAL FIELD

The present invention relates to a piston for a master cylinder of a vehicle.

BACKGROUND ART

A master cylinder is a device for generating hydraulic power in a hydraulic brake system.

A master cylinder includes a cylinder housing and a piston which is movably disposed in the cylinder housing. Further, a sealing member which is installed in an inner surface of the housing, and the piston is provided with a communication hole. The sealing member has a cup shape and is also called a cup seal.

The cylinder housing and the piston form cooperatively a pressure chamber for generating hydraulic pressure at a side toward which the piston moves forward, and a hydraulic supplying chamber which communicates with a reservoir is formed between the cylinder housing and an outer surface of the piston. The sealing member partitions the hydraulic supplying chamber and the pressure chamber.

In this configuration, a shape of the sealing member is changed during the movement of the piston, and if the changed shape of the sealing member does not return to its original shape during the movement of the piston, an oil passage may be blocked and thus there may be problems of meaningless backward movement and of residual pressure.

DETAILED DESCRIPTION OF THE INVENTION

Technical Problem

The present invention has been made in an effort to provide a piston for a master cylinder which minimizes meaningless backward movement and delay of braking release.

Technical Solution

A master cylinder according to an exemplary embodiment of the present invention includes: a cylinder housing; a piston which is movably disposed in the cylinder housing so as to form a pressure chamber and a hydraulic fluid supplying chamber; a sealing member which is interposed between the cylinder housing and the piston. The piston has a plurality of communication holes for connecting the pressure chamber and the hydraulic fluid supplying chamber, and the plurality of communication holes are formed on a slanted surface which is provided to an outer surface of the piston.

The plurality of communication holes may be arranged to move sequentially in a rearward direction and subsequently move sequentially in a forward direction from the communication hole which is front-most disposed.

The plurality of communication holes may be arranged to move sequentially in a rearward direction so that the communication hole which is front-most disposed and the communication hole which is rear-most disposed are disposed to be adjacent in a state of being spaced from one another by a predetermined distance.

A center line of the communication hole may be perpendicular to a longitudinal direction of the piston.

The plurality of the communication holes may include the communication hole having a center line perpendicular to a longitudinal direction of the piston and the communication hole having a center line inclined with respect to the longitudinal direction of the piston such that a radial outer end thereof becomes closer to a rear side of the piston.

In an exemplary embodiment of the present invention, a piston which is installed in a cylinder housing of a master cylinder includes a plurality of communication holes which are respectively configured to communicate with an inner side and an outer side thereof. The plurality of communication holes are formed on a slanted surface which is provided to an outer surface of the piston.

Advantageous Effects

According to the present invention, hydraulic fluid can be effectively discharged from the pressure chamber when a piston moves rearward so that delay of braking release can be minimized.

DETAILED DESCRIPTION OF THE EMBODIMENTS

Embodiments of the present invention will be described in detail with reference to the accompanying drawings hereinafter.

Figure 1:
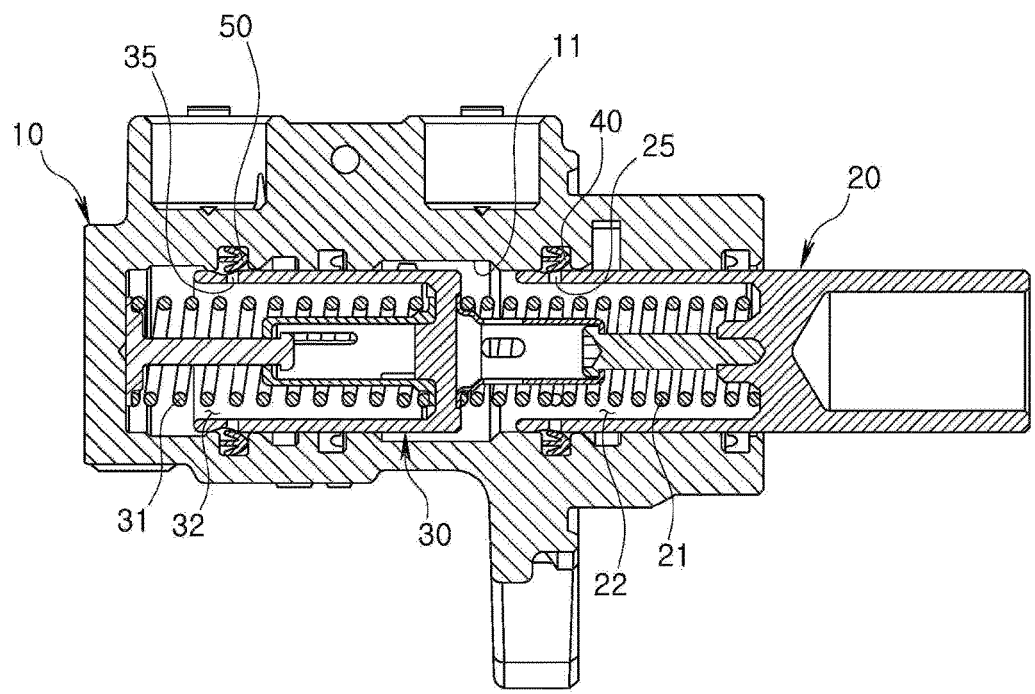
FIG. 1 is a sectional view of a master cylinder according to an embodiment of the present invention.
Figure 2:
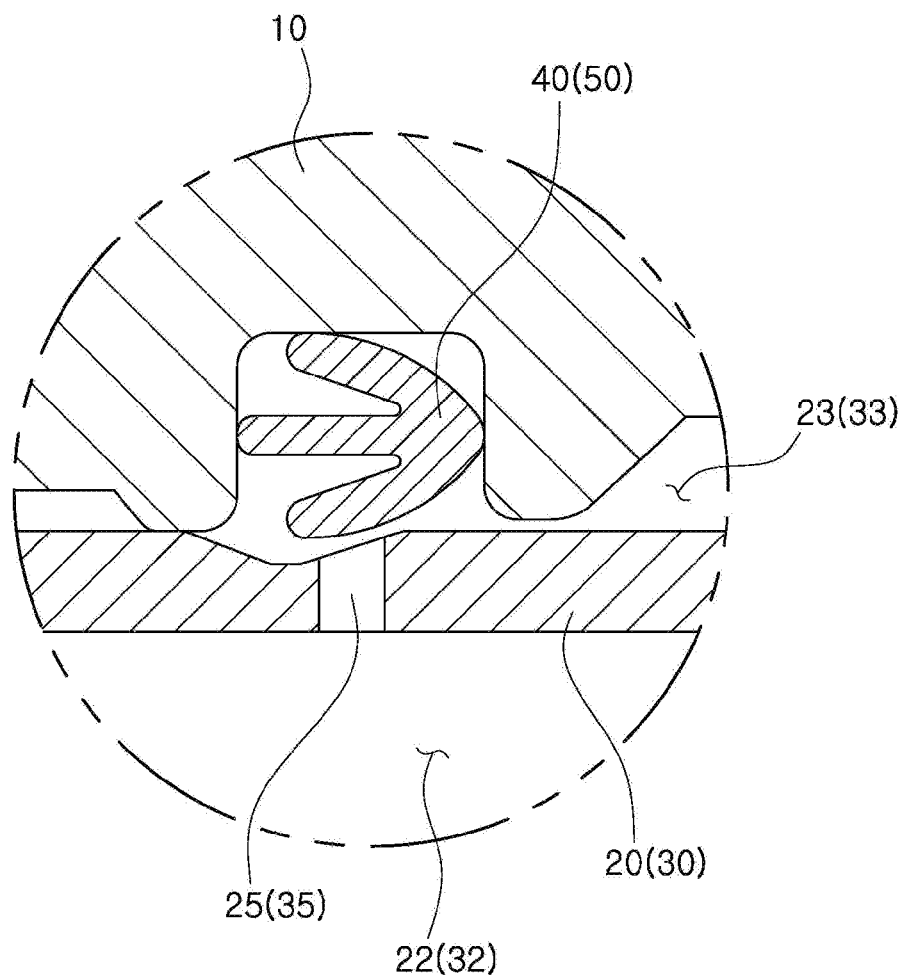
FIG. 2 is a partial enlarged view of a master cylinder according to an embodiment of the present invention.

Referring to FIG. 1, a master cylinder includes a cylinder housing 10 and a first piston 20 and a second piston 30 which are respectively disposed therein to be movable forward and rearward. In detail, the cylinder housing 10 defines a bore 11 which is extended in a longitudinal direction thereof, and the first piston 20 and the second piston 30 are movably disposed in the bore 11. Meanwhile, not shown in the drawings, the master cylinder is connected to a hydraulic fluid reservoir (not shown) so as to be supplied with hydraulic fluid.

The first piston 20 is elastically supported against the second piston 30 by a first resilient spring 21, and the second piston 30 is elastically supported against the cylinder housing 10 by a second resilient spring 31.

A first pressure chamber 22 is formed between the first piston 20 and the second piston 30, and a second pressure chamber 32 is formed between the second piston 30 and a frontal wall of the cylinder housing 10. The pressurized fluid (e.g., hydraulic oil) may be respectively supplied to brake driving cylinders (not shown) via fluid discharging passages.

Hydraulic fluid supplying chambers 23 and 33 are respectively formed between outer circumferential surfaces of the first piston 20 and the second piston 30 and an inner circumferential surface of the cylinder housing 10. The hydraulic fluid supplying chambers 23 and 33 are respectively connected to the hydraulic fluid reservoir via fluid passages. Accordingly, the hydraulic fluid of the hydraulic fluid reservoir may be supplied to the hydraulic fluid supplying chambers via the fluid passages.

A first sealing member 40 and a second sealing member 50 are respectively interposed between the first piston 20 and the second piston 30 and an inner circumferential surface of the cylinder housing 10. For example, the first sealing member 40 and the second sealing member 50 may be disposed in grooves which are respectively formed on an inner circumferential surface of the cylinder housing 10. The first sealing member 40 and the second sealing member 50 contact both the inner circumferential surface of the cylinder housing 10 and the outer circumferential surfaces of the first piston 20 and the second piston 30 so as to partition the hydraulic fluid supplying chambers 23 and 33 and the pressure chambers 22 and 32. Meanwhile, referring to FIG. 3, a plurality of communication holes 25 and 35 are respectively formed in the first piston 20 and the second piston 30. The communication holes 25 and 35 may be through holes which extend from an inner circumferential surface to an outer circumferential surface of the first piston 20 and the second piston 30.

The pressure chambers 22 and 32 and the hydraulic fluid supplying chambers 23 and 33 are selectively communicated with one another depending on the relative positions between the communication holes 25 and 35 and the sealing members 40 and 50. That is, in case that the first piston 20 and the second piston 30 move forward so that the communication holes 25 and 35 are positioned in the front side of the sealing members 40 and 50 (i.e., brake applying state), the pressure chambers 22 and 32 and the hydraulic fluid supplying chambers 23 and 33 are blocked from one another by the sealing of the sealing members 40 and 50, and on the other hand, in case that the first piston 20 and the second piston 30 move rearward so that the communication holes 25 and 35 are positioned in the rear side of the sealing members 40 and 50 (i.e., brake release state), the pressure chambers 22 and 32 and the hydraulic fluid supplying chambers 23 and 33 are communicated with one another.

Figure 4:
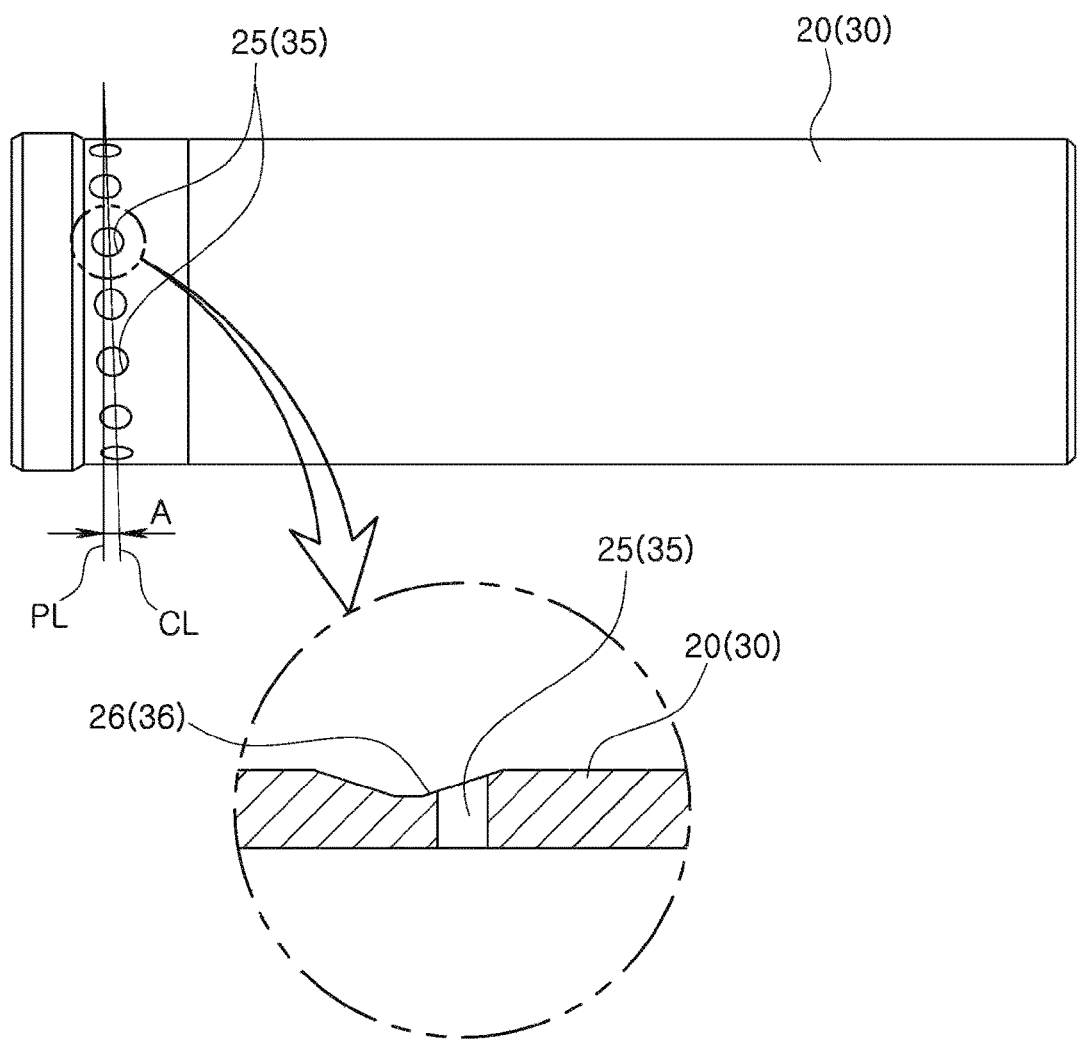
FIG. 4 is a drawing showing a piston according to an embodiment of the present invention.

Referring to FIG. 4, a piston for a master cylinder according to an embodiment of the present invention will be described.

The pistons 20 and 30 respectively have a plurality of communication holes 25 and 35, and the plurality of communication holes 25 and 35 are arranged along circumferential direction of the pistons 20 and 30. At this time, referring to FIG. 4, the plurality of communication holes 25 and 35 are not disposed at one position along a longitudinal direction (a horizontal direction in FIG. 4) of the pistons 20 and 30, but are arranged at different positions in a longitudinal direction, and the plurality of communication holes 25 and 35 which are respectively arranged along a circumferential direction are arranged to move sequentially in a rearward direction from a front side of the pistons 20 and 30 and subsequently move sequentially in a forward direction.

That is, at one side of the pistons 20 and 30, as shown in FIG. 4, the communication holes 25 and 35 are arranged such that the lower one moves gradually rearward so that lines CL connecting centers of the communication holes 25 and 35 are inclined to form an angle A relative to lines PL which is perpendicular to the longitudinal direction of the pistons 20 and 30, and on the contrary, at the other side of the pistons 20 and 30, the communication holes 25 and 35 are arranged such that the upper one moves gradually forward.

At this time, as shown in a dotted line of FIG. 4, the plurality of communication holes 25 and 35 may be disposed on slanted surfaces 26 and 36 of the pistons 20 and 30. At this time, centers of the communication holes of the pistons 20 and 30 which are respectively disposed at a front-most side may be disposed at starting points of the slanted surfaces 26 and 36.

Figure 5:
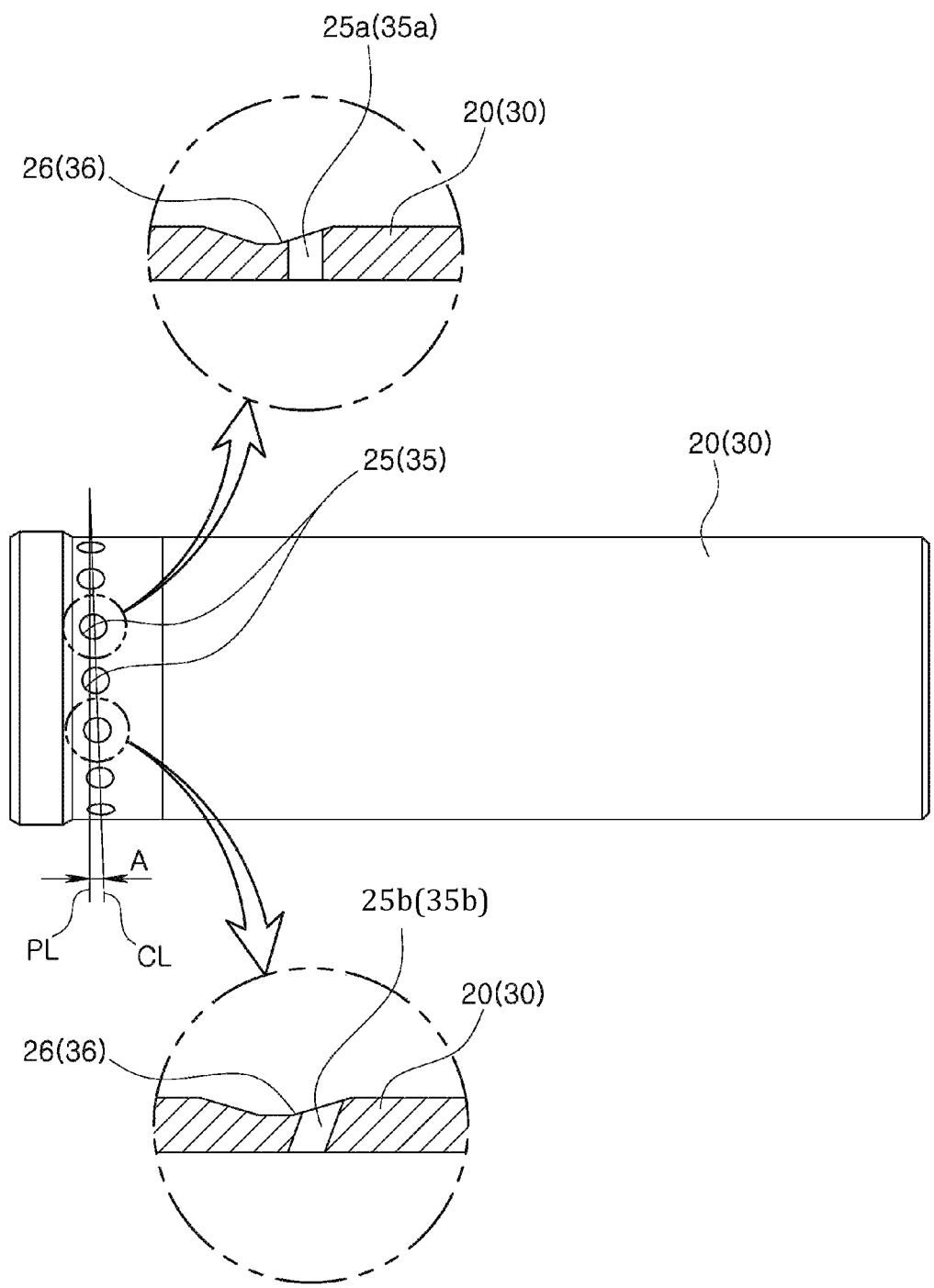
FIG. 5 is a drawing showing a piston according to another embodiment of the present invention.

Referring to FIG. 5, a piston for a master cylinder according to another embodiment of the present invention will be described.

Figure 3:
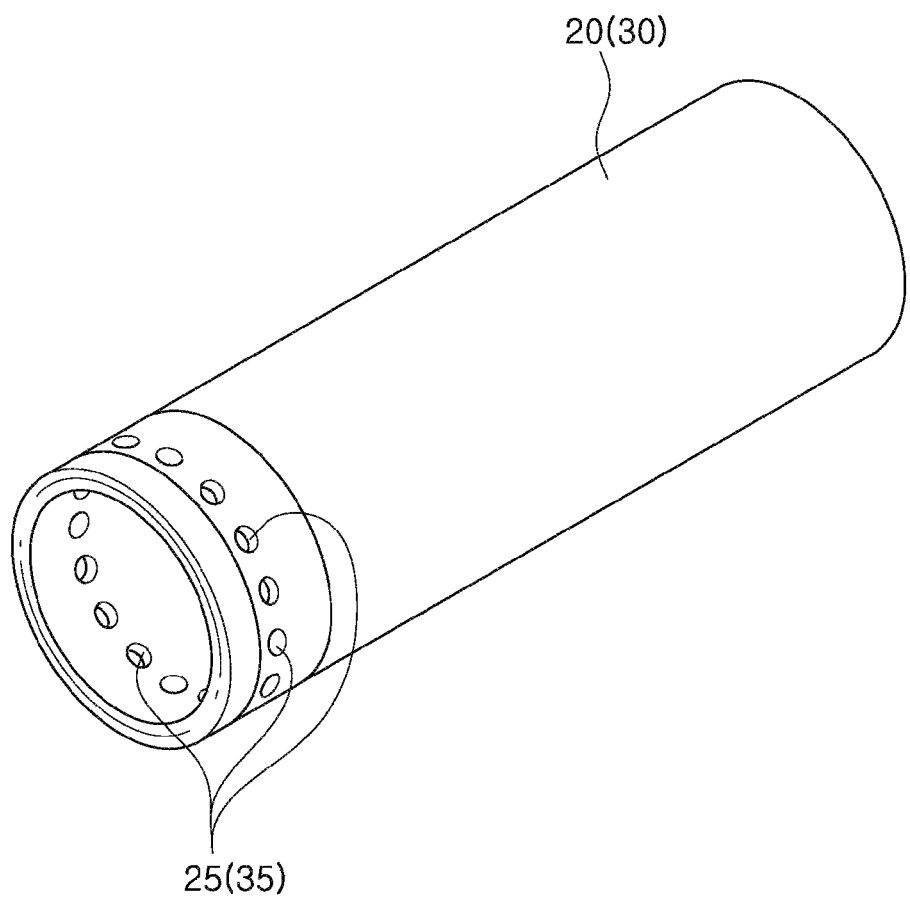
FIG. 3 is a perspective view of a piston of a master cylinder according to an embodiment of the present invention.

The disposition of the communication holes 25 and 35 of this embodiment is equal to FIG. 3, but the communication holes 25 and 35 includes communication holes 25a and 35a having center lines perpendicular to a longitudinal direction of the pistons 20 and 30, and communication holes 25b and 35b having a center line inclined with respective to a line perpendicular to a longitudinal direction of the pistons 20 and 30. That is, the communication holes 25b and 35b are formed to be inclined such that radial outer ends thereof become closer to a rear side of the pistons 20 and 30.

Figure 6:
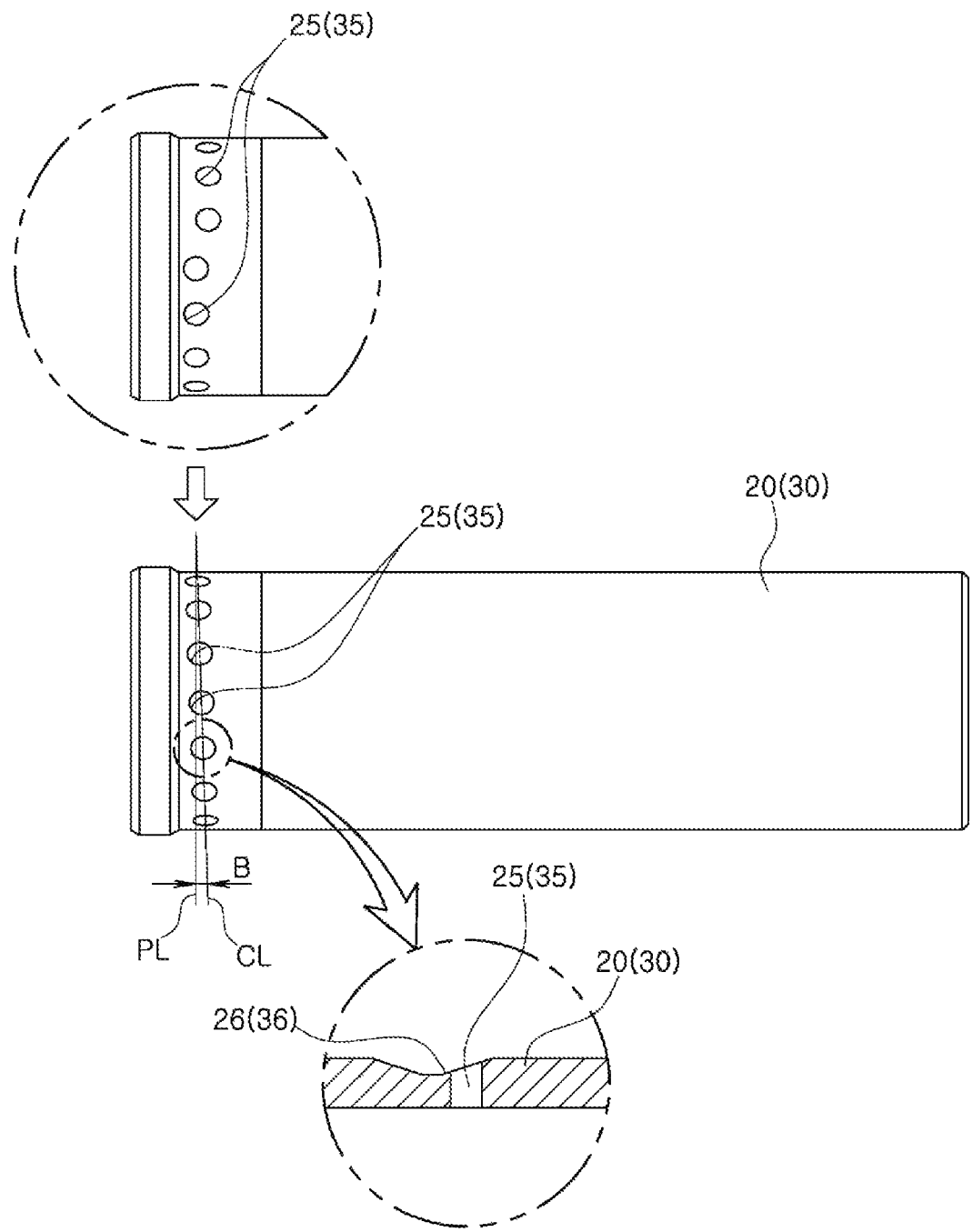
FIG. 6 is a drawing showing a piston according to yet another embodiment of the present invention.

Referring to FIG. 6, a piston for a master cylinder according to yet another embodiment of the present invention will be described.

The pistons 20 and 30 respectively have a plurality of communication holes 25 and 35, and the communication holes 25 and 35 are arranged along circumferential directions of the pistons 20 and 30. At this time, referring to FIG. 6, the plurality of communication holes 25 and 35 are not disposed at one position along a longitudinal direction (a horizontal direction in FIG. 4) of the pistons 20 and 30, but are arranged at different positions in a longitudinal direction, and the plurality of communication holes 25 and 35 which are respectively arranged along a circumferential direction are arranged to move sequentially in a rearward direction from a front side of the pistons 20 and 30. Accordingly, as shown in a dotted-line circle, the communication hole which is front-most disposed and the communication hole which is rear-most disposed are disposed to be adjacent in a state of being spaced from one another by a predetermined distance in a longitudinal directions of the piston.

At this time, as shown in a dotted line of FIG. 4, the plurality of communication holes 25 and 35 may be disposed on slanted surfaces 26 and 36 of the pistons 20 and 30. At this time, centers of the communication holes of the pistons 20 and 30 which are respectively disposed at a front-most side may be disposed at starting points of the slanted surfaces 26 and 36.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a piston for a master cylinder of a vehicle, so the present invention has an industrial applicability.

The invention claimed is:

1. A master cylinder comprising:
   a cylinder housing having a hydraulic fluid supplying chamber;
   a piston movably disposed in the cylinder housing and having a pressure chamber; and
   a sealing member interposed between the cylinder housing and the piston,
   wherein the piston has a plurality of communication holes for connecting the pressure chamber and the hydraulic fluid supplying chamber,
   wherein the plurality of communication holes are disposed on a slanted portion of an outer surface of the piston,
   wherein the plurality of communication holes are located sequentially in a rearward direction from a first communication hole of the plurality of communication holes, which is front-most disposed, up to a second communication hole of the plurality of communication holes, which is rear-most disposed, and subsequently are located sequentially in a forward direction from the second communication hole up to the first communication hole, and
   wherein the plurality of the communication holes comprise a third communication hole having a center line perpendicular to a longitudinal direction of the piston and a fourth communication hole having a center line inclined with respect to the longitudinal direction of the piston such that a radial outer end thereof becomes closer to a rear side of the piston.

2. A master cylinder comprising:
   a cylinder housing having a hydraulic fluid supplying chamber;
   a piston movably disposed in the cylinder housing and having a pressure chamber; and
   a sealing member interposed between the cylinder housing and the piston,
   wherein the piston has a plurality of communication holes for connecting the pressure chamber and the hydraulic fluid supplying chamber,
   wherein the plurality of communication holes are disposed on a slanted portion of an outer surface of the piston,
   wherein the plurality of communication holes are located sequentially in a rearward direction so that a first communication hole of the plurality of communication holes, which is front-most disposed, and a second communication hole of the plurality of communication holes, which is rear-most disposed, are located adjacently and spaced from one another by a predetermined distance, and
   wherein the plurality of the communication holes comprise a third communication hole having a center line perpendicular to a longitudinal direction of the piston and a fourth communication hole having a center line inclined with respect to the longitudinal direction of the piston such that a radial outer end thereof becomes closer to a rear side of the piston.

3. A piston configured to be installed in a cylinder housing of a master cylinder, the piston comprising a plurality of communication holes respectively configured to communicate with an inner side and an outer side thereof,
   wherein the plurality of communication holes are disposed on a slanted portion of an outer surface of the piston,
   wherein the plurality of communication holes are located sequentially in a rearward direction from a first communication hole of the plurality of communication holes, which is front-most disposed, up to a second communication hole of the plurality of communication holes, which is rear-most disposed, and subsequently are located sequentially in a forward direction from the second communication hole up to the first communication hole, and
   wherein the plurality of the communication holes comprise a third communication hole having a center line perpendicular to a longitudinal direction of the piston and a fourth communication hole having a center line inclined with respect to the longitudinal direction of the piston such that a radial outer end thereof becomes closer to a rear side of the piston.

4. A piston configured to be installed in a cylinder housing of a master cylinder, the piston comprising a plurality of communication holes respectively configured to communicate with an inner side and an outer side thereof,
   wherein the plurality of communication holes are disposed on a slanted portion of an outer surface of the piston,
   wherein the plurality of communication holes are located sequentially in a rearward direction so that a first communication hole of the plurality of communication holes, which is front-most disposed, and a second communication hole of the plurality of communication holes, which is rear-most disposed, are located adjacently and spaced from one another by a predetermined distance, and
   wherein the plurality of the communication holes comprise a third communication hole having a center line perpendicular to a longitudinal direction of the piston and a fourth communication hole having a center line inclined with respect to the longitudinal direction of the piston such that a radial outer end thereof becomes closer to a rear side of the piston.

* * * * *